United States Patent
Schindler et al.

(10) Patent No.: US 10,031,739 B1
(45) Date of Patent: Jul. 24, 2018

(54) SYSTEM AND METHOD FOR UPDATING A JAVA MANAGEMENT EXTENSIONS COLLECTOR

(71) Applicant: EMC IP Holding Company LLC, Hopkinton, MA (US)

(72) Inventors: Sergey Schindler, Discovery Bay, CA (US); Arun Kannan, Bangalore (IN); Renu Yarday, Bangalore (IN); Muralidhara Tirupati, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/084,604

(22) Filed: Mar. 30, 2016

(51) Int. Cl.
| | |
|---|---|
| *G06F 9/445* | (2018.01) |
| *G06F 17/30* | (2006.01) |
| *G06F 8/65* | (2018.01) |
| *G06F 8/61* | (2018.01) |

(52) U.S. Cl.
CPC .............. *G06F 8/65* (2013.01); *G06F 8/61* (2013.01); *G06F 17/30106* (2013.01)

(58) Field of Classification Search
CPC combination set(s) only.
See application file for complete search history.

(56) References Cited

U.S. PATENT DOCUMENTS

| 5,713,024 A | * | 1/1998 | Halladay | G06F 11/1438 714/13 |
| 7,769,990 B1 | * | 8/2010 | Okcu | G06F 9/4411 713/1 |
| 9,274,811 B1 | * | 3/2016 | Reeves | G06F 8/61 |
| 2012/0036552 A1 | * | 2/2012 | Dare | H04L 41/0253 726/1 |

\* cited by examiner

Primary Examiner — Viva Miller
(74) Attorney, Agent, or Firm — Staniford Tomita LLP

(57) ABSTRACT

This disclosure relates to a method, article of manufacture, and apparatus for updating a Java management extensions (JMX) collector. In some embodiments, this includes monitoring the output of a JMX provider details for a cloud computing platform. MBean tree structures from the cloud computing platform are analyzed. If changes in an MBean tree structure are detected, a revised JMX collector data file is prepared. If the revised JMX collector data file is determined to be different than an installed JMX collector data file, the installed JMX collector data file is backed up and replaced with the revised JMX collector data file. Data from the cloud computing platform is stored in a computer memory using configuration settings from the revised JMX collector data file.

10 Claims, 5 Drawing Sheets

SYSTEM AND METHOD FOR UPDATING A JAVA MANAGEMENT EXTENSIONS COLLECTOR

FIELD

The present invention is related to monitoring and reporting (M&R) software systems used for development of applications designed to run on cloud computing platforms.

BACKGROUND

Many large scale computing platforms are designed to run increasingly large number of specialized applications. Software Defined Data Centers (SDDC) are becoming common as enterprises look to cost-effectively increase their resources by converting their physical datacenters to a virtual infrastructure. This virtual infrastructure enables new approaches to application development, designed specifically to run in a software-defined data center, where all elements of the infrastructure, from networking, storage, CPU, and security, are virtualized and delivered as IT (information technology) as a service. These SDDCs are virtual datacenters may be designed to run tens or hundreds of thousands of application instances. The development process of such application and scale of these applications' deployment requires a different approach that supports the full lifecycle of the application, from initial development, through all testing stages, to deployment and scaling. This approach is therefore well suited to the continuous delivery strategy. Such application delivery platforms require high degree of agility and scalability to provide maximum value for the investment and rapid monitoring capabilities to react to constantly changing level of customer demand for the services that such applications offer. It is also important that the monitoring components of such agile application platforms were able to adjust to the continuously changing architecture and scale of such application development and delivery platform.

Monitoring and reporting (M&R) software is used with cloud computing platforms to retrieve information from various data sources to provide real-time, historical, and projected visibility into the performance of infrastructure and business services. The M&R multi-tier architecture is composed of modules that can be installed on a single server or be distributed and scaled over multiple servers. The M&R system can include collectors, which record data from the cloud computing platform and store data in databases. This M&R system can be used to produce system reports, alerts and logs from the data stored in the database. With comprehensive Web dashboards and targeted reports, the M&R can provide in real-time, the status of the managed infrastructure and business services. This information can be used to troubleshoot problems, understand trends, and verify compliance of service level agreements.

A problem with the data collector in the M&R system is that it must be manually configured to specify the data to be recorded by the data collector. This manual configuration requirement can lead to data not being recorded when the data transmitted by the cloud computing platform changes to metrics that are not in the data collection configuration or the cloud computing platform itself changes its configuration. The time needed to manually change the configuration settings will depend completely upon the availability of the system administrators and this new metric data will not be recorded until the collector is properly reconfigured to record the new metric data. It is not uncommon for several days to elapse before the configuration settings are manually corrected. Because a substantial amount of data may fail to be recorded, an automated system is needed, which automatically configures the data collectors used in M&R systems so that the collector will be able to record all desired data after the metrics have changed.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

M&R software can include collectors that retrieve data from data sources in cloud computing platforms. Disclosed herein are systems and methods of updating Java management extensions (JMX) collectors. JMX is a Java technology that supplies tools for managing and monitoring applications, system objects, devices (e.g. printers) and service-oriented networks. One aspect includes a method of providing the initial configuration of the JMX collector in an automated manner. Such method can be done based on the retrieval of the JMX provider settings. In an embodiment the retrieval operation reads the JMX provider settings using its hypertext transfer protocol (HTTP) Application Programming Interface (API) and inserts these settings into JMX collector configuration file. Yet another aspect includes a method for subsequent periodic changes and updates of the JMX collector in an automated manner. Such method can be based on retrieval of JMX provider metrics details asynchronously. In an embodiment this change retrieval operation reads JMX provider metrics using its JMX API and updates JMX collector with the new metrics to be collected.

Figure 1:
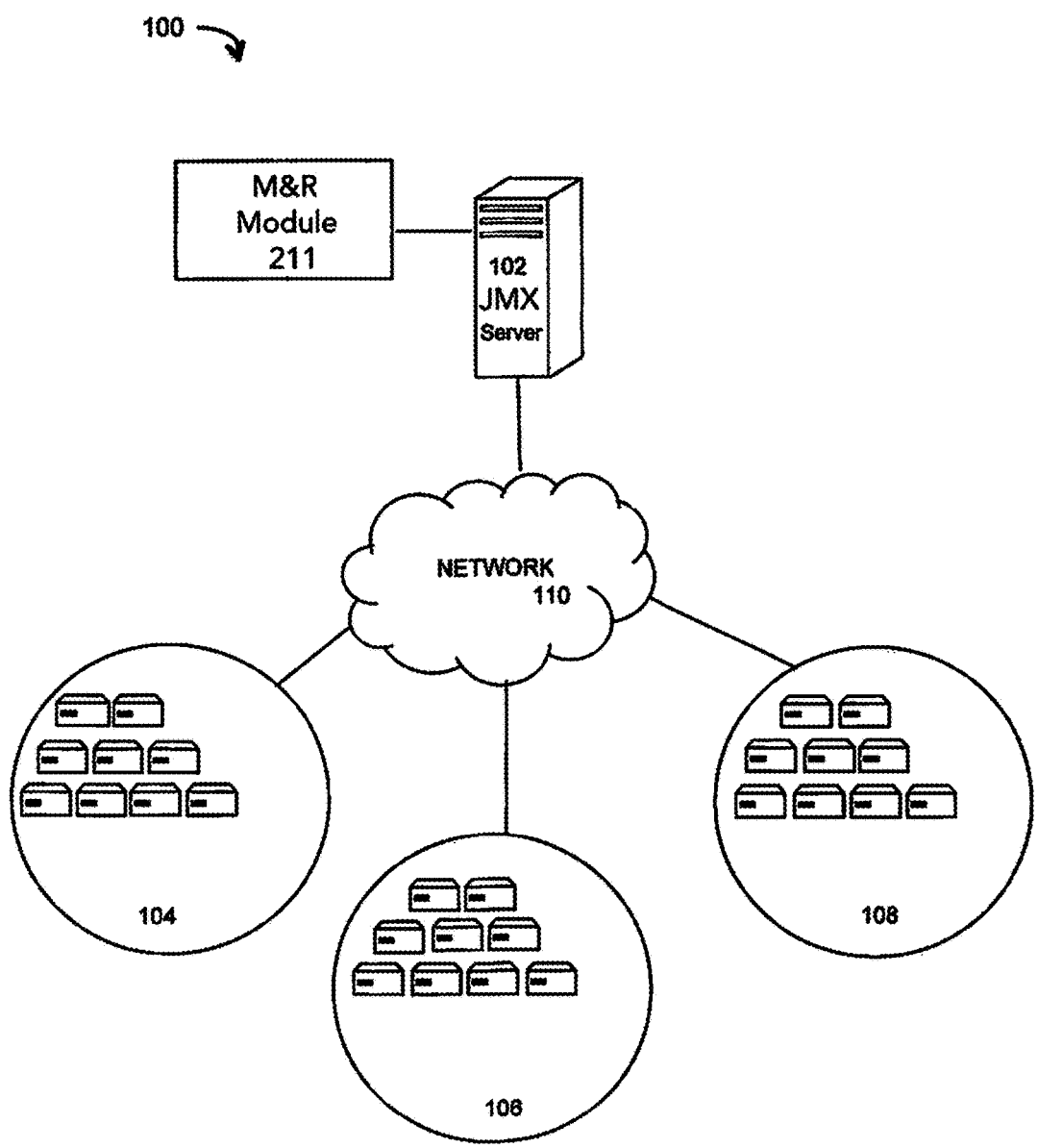
FIG. 1 is a diagram of a system configured to provide multi-tenancy cloud service in accordance with some embodiments.

FIG. 1 illustrates a computer network system 100 that implements M&R software. In system 100, a number of data sources 104, 106, and 108 that represent various components of such application development platforms. The data sources 104, 106, and 108 are coupled together via network 110, which may be a cloud network. A network JMX server computer 102 is coupled directly or indirectly to these data sources 104, 106, and 108 through network 110. The network system 100 may contain any number of such data sources. The network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. Network 100 may represent a multi-tenant network in which a server computer runs a single instance of a program serving multiple clients (tenants). The JMX server 102 runs the JMX Provider software that may act as consolidation point for monitoring data collected from multiple other components of application development platform 104, 106 and 108. M&R software module 211 makes use of this consolidated data by connecting to the JMX server 102 and retrieving this data.

Figure 2:
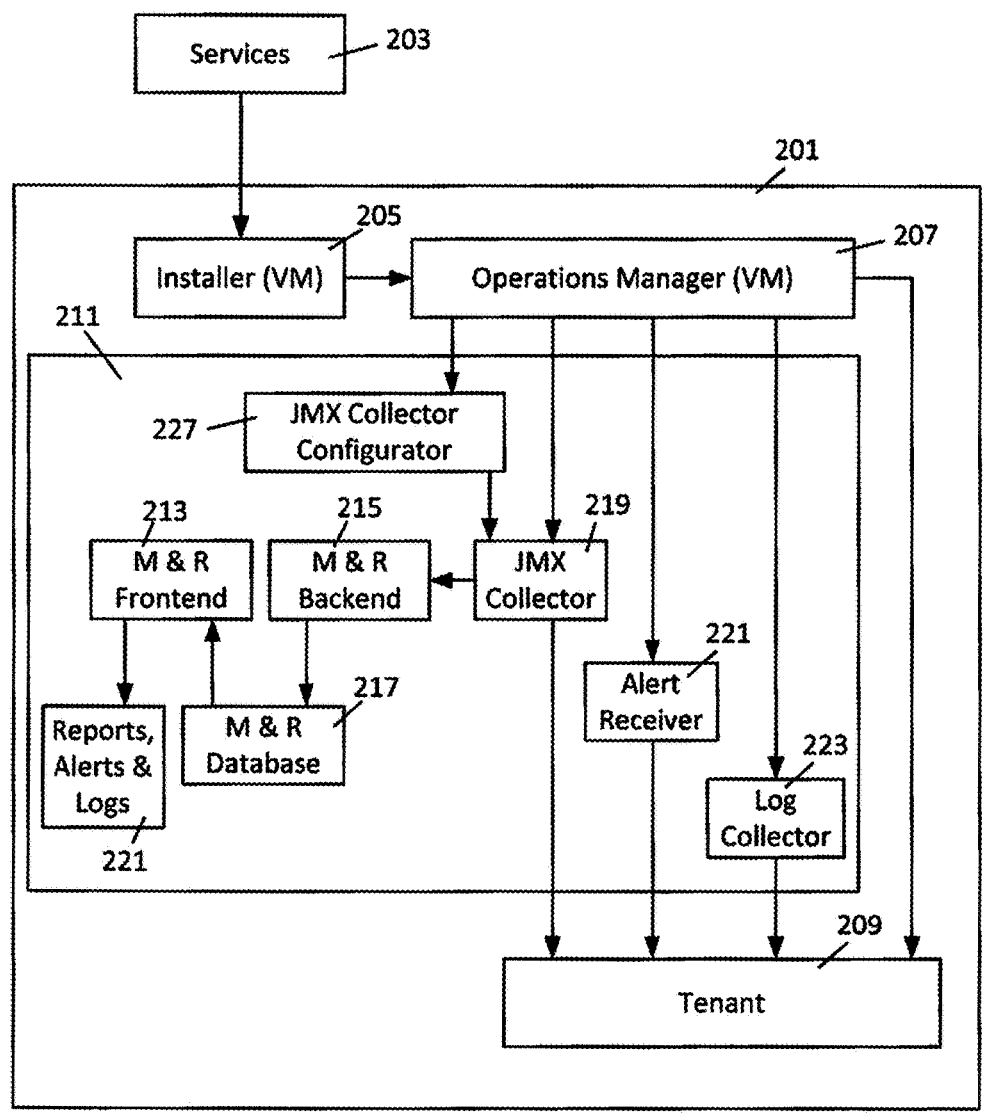
FIG. 2 is a diagram of an M&R module used with a multi-tenancy cloud service in accordance with some embodiments.

FIG. 2 illustrates a more detailed block diagram of an embodiment of a monitoring and reporting (M&R) software module 211 used with a cloud computing platform 201. The cloud computing platform 201 can use services 203 that can be deployed to an installer 205 that provides the services to an Operations Manager 207. The M&R module 211 can be used to retrieve operational metrics from the operations manager 207. Information from the operations manager 207 can be transmitted directly to the tenants 209 or through the M&R module 211 to the tenants 209.

The M&R module 211 can include a JMX collector 219, an M&R backend 215, an M&R database 217 and an M&R frontend 213. The JMX collector 219 can retrieve and record raw data from JMX enabled application in the cloud computing platform 207. Examples of a JMX enabled application include Pivotal Cloud Foundry Operations Manager metrics. The metrics recorded by the JMX collector 219 is transmitted to the M&R backend 215 which is connected to the M&R database 217 where the data recorded by the JMX collector is stored. The M&R backend module 215 can receive, normalize and consolidate the collected data. Data aggregation can be performed for acceleration and data retention can be managed for storage optimization.

The M&R front end 213 uses the data in the M&R database 217 to produce reports, alerts and logs 221 for the cloud system administrators. The M&R module 211 can be a single virtual machine (VM) or distributed across multiples virtual machines. Examples include a dedicated VM for frontend, another dedicated VM for backend, yet another VM for database and one more VM for the frontend. In addition to the JMX collector 219, the M&R module 211 can have other collecting mechanisms that can record data from the operations manager 207 of the cloud computing platform 201, including an alert receiver 221 and a log collector 223.

The metric data recorded by the JMX collector 219 is determined by a JMX collector data file, which can define the metrics that are recorded by the JMX collector 219. Thus, only information from the operations manager 207 that matches the metrics in the JMX collector data file is recorded. Information metrics that do not match the JMX collector data file are not recorded. When new metrics are transmitted by the cloud computing platform 207, this new metric data is not recorded by the JMX collector 219 until the JMX collector data file is updated to include this new metric.

In an embodiment, the JMX collector data file of the M&R module 211 is a static file that is automatically updated by a JMX collector configurator, that adapts to changes in the JMX provider by generating and installing new JMX collector data files on the fly for the M&R module 211. Without an automatic updating system, the JMX collector data file must be changed manually, as described in the background to update the JMX collector data file. New metric data output by the operations manager 207 of the cloud computing platform 201 is not recorded by the JMX collector 219 until the JMX collector data file is updated. As discussed, in prior systems, the JMX collector data file required manually updating and new metric data that did not match the old JMX collector data file was not recorded until the manual update was completed.

In order to eliminate this problem, JMX collector configurator 227 is used to automatically and continuously update the JMX collector data file used by the JMX collector 219. The automatic updating of the JMX collector data file can be performed continuously at regular time intervals of a few minutes, such as, every 5 to 10 minutes. Alternatively, the system can be configured to check for possible updates to the JMX collector data file at any other suitable time interval. It is possible that some data that does not match the JMX collector data file will not be recorded by the JMX collector 219 during this time interval. However, the amount of unrecorded data will be minimal after a data metrics output change by the operations manager 207.

Figure 3:
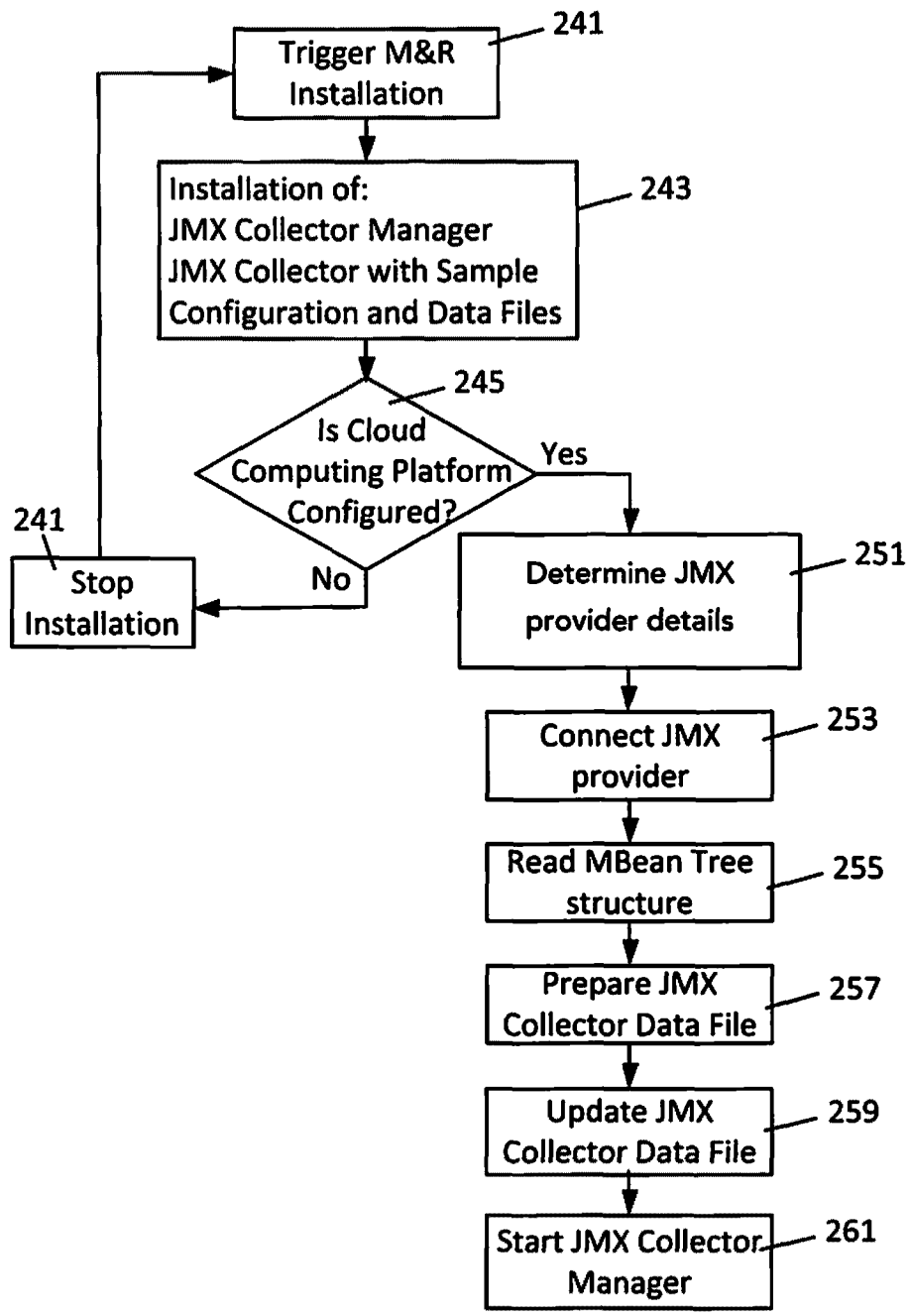
FIG. 3 is a flow chart illustrating a method for installing a JMX collector with a JMX collector data file.

With reference to FIG. 3, an embodiment of a flowchart for installing the M&R software module with a JMX collector using an API in a cloud computing platform is illustrated. A system administrator can trigger the M&R module installation 241. A software installer can install a JMX collection manager and a JMX collector with sample confirmation and data files 243 on the cloud computing platform. The installer can then be checked to determine if the cloud computing platform is properly configured 245. If the platform is not properly configured, the system can stop the M&R module installation 241 and the installation process can be restarted.

Once the cloud computing platform is determined to be properly configured, the system can invoke the installation of a JMX collector configurator, which can include an API, which can be used to automatically determine the JMX provider details from the operations manager 251. The JMX collector configurator API can be connected to the JMX provider 253, and monitor data being transmitted by the JMX provider operations manager. In an embodiment, the API can be a separate program that listens to all messages from the operations manager over a transmission control protocol (TCP) connection and monitor the JMX provider cloud computing platform output with a TCP listener that can run on the M&R server.

In an embodiment, the TCP listeners in the JMX collector configurator can monitor the TCP data on a TCP port, and parses messages from the cloud computing platform into pre-identified metrics. More specifically, the JMX collector configurator can have scripts and scheduled tasks that automatically read the managed bean (MBean) tree structures of the parsed messages transmitted by the operations manager of the JMX provider 255. The MBean is a type of JavaBean that represents a resource running in the Java virtual machine, such as an application or a Java EE technical service (transactional monitor, JDBC driver, etc.).

Figure 4:
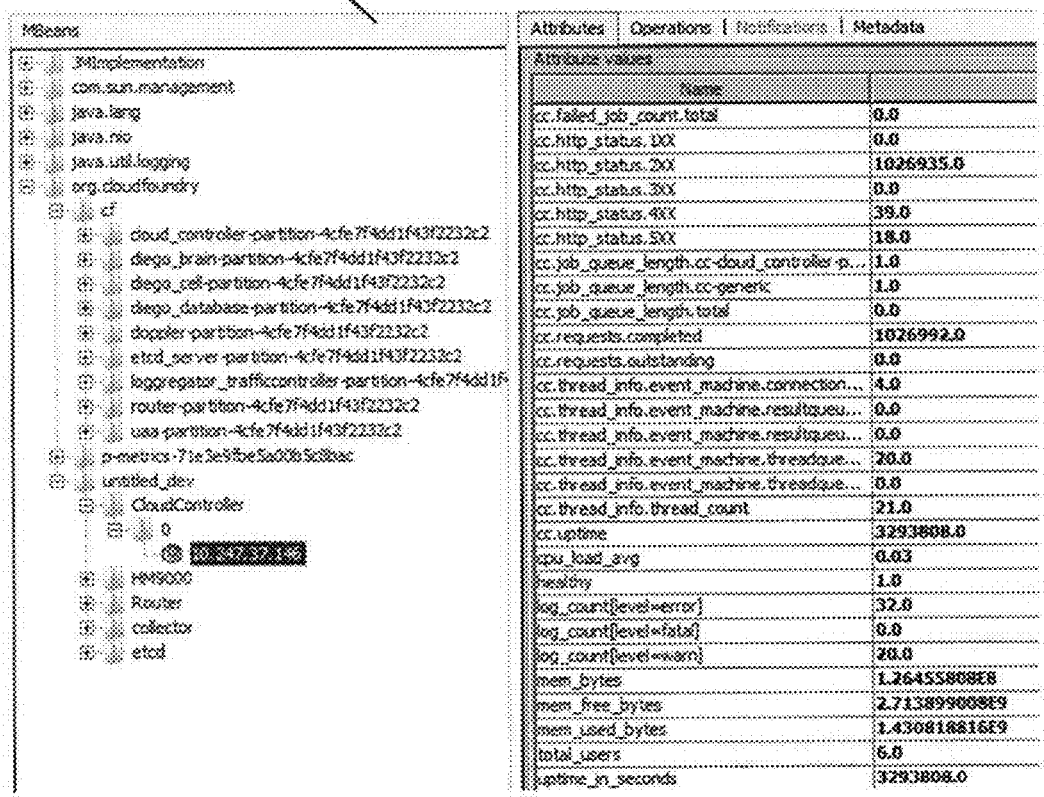
FIG. 4 is an example MBean tree structure.

With reference to FIG. 4, an example MBean tree structure 270 is illustrated. The MBean tree structures can be analyzed to determine the attributes and values of the JMX provider data. From the MBean tree structures, the JMX collector configurator API can identify all available metrics and prepare a static JMX collector configuration file 257. Table 1 is an example listing of sample cloud controller metrics identified from an MBean tree structure.

TABLE 1

SAMPLE CLOUD CONTROLLER METRICS cc.http_status.1XX
cc.http_status.1XX
cc.http_status.1XX
cc.http_status.1XX
cc.http_status.1XX
cc.requests.outstanding Table 2 is an example listing of sample router metrics identified from an MBean tree structure.

TABLE 2

SAMPLE ROUTER METRICS router.bad_gateways
router.rejected_requests
router.routed_app_requests
router.requests_per_sec
router.total_routes
router.responses.2XX
router.responses.3XX Once the JMX collector configurator finishes creating the JMX collector configuration file, the JMX collector configurator can be updated and replace the sample JMX collector configuration file 259. After the JMX collector configuration file has been updated, the JMX collector manager can be started and the JMX collector can record information from the operations manager of the JMX provider 261.

Once the M&R module is running with the updated JMX collector configuration file and the JMX collector is recording all metric data, the M&R module can continue to monitor the output of the cloud computing platform to detect changes in the metric data. In an embodiment, the JMX collector configurator 227 can include an API and perform an API call to determine the output metrics of the operations manager of the cloud computing platform.

Figure 5:
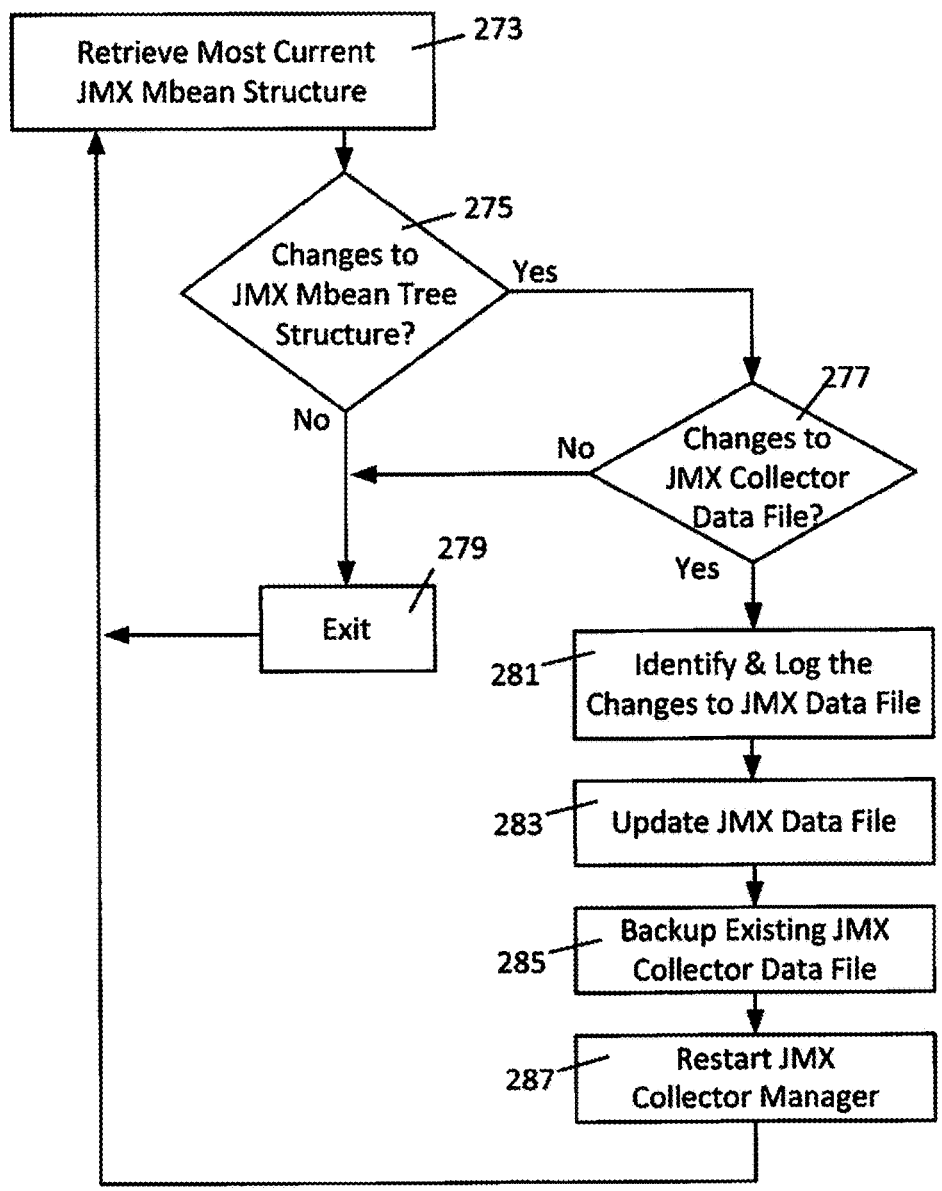
FIG. 5 is a flow chart illustrating a method for updating a JMX collector data file.

With reference to FIG. 5, a flow chart of an embodiment of the M&R module monitoring process for updating the JMX collector configuration file by a JMX collector configurator is illustrated. The M&R module can have a task scheduler, which can schedule a sequence of tasks for obtaining the most current Mbean structure from the output of the cloud computing platform and updating the JMX collector configuration file of the JMX collector. To monitor the output of the cloud computing platform, the scheduler can invoke the JMX collector configurator to retrieve the most current JMX Mbean structure 273. In an embodiment, a Java applet can be used to retrieve the current Mbean structure using JMX API. The JMX collector configurator can then analyze the Mbean tree structure and compare the current tree structure to the prior retrieved Mbean tree structure to determine if there have been any changes 275. If there are no changes to the Mbean tree structure, then no new metrics are being output by the cloud computing platform and the JMX collector configurator can exit the JMX collector configuration file update process 279. The configurator can wait for the next Mbean retrieval command from the M&R task scheduler 273.

If there are changes in the Mbean tree structure, the JMX collector configurator can then determine if there are any changes to the JMX collector data file 277. If there are no changes the JMX collector data file, then there is no need to update the JMX collector data file. The JMX collector configurator API can exit the JMX collector configuration file update process 279 and wait for the next Mbean retrieval.

If there are changes to the JMX collector data file, the JMX collector configurator can identify and log the changes to the JMX collector data file 281. The JMX collector configurator can then update the JMX collector data file 283, which are generated on the fly without any interruption to the JMX collector. In an embodiment, the JMX collector data file can be an Extensible Markup Language (XML) data file. However, in other embodiments, the JMX collector data file can be any other suitable protocol. The JMX collector configurator can backup the prior JMX collector data file before replacing this prior version with the most current updated JMX collector data file. After the JMX collector data file has been updated, the JMX collector configurator can restart the JMX collector manager to implement the JMX collector recording with the most updated JMX collector data file so that all metric data can be recorded. If there are problems with the updated JMX collector data file, the M&R system can reinstall the prior saved JMX collector data file.

In an embodiment, the scheduler can be configured to retrieve Mbeans at a set time interval. For example, the Mbean may be retrieved every few minutes, such as, no less than every 5 minutes and less than every 10 minutes. However, in other embodiments, the scheduler can be configured to retrieve a current Mbean at any other time interval or on demand. Because there is a predetermined time interval, data will not be recorded for new metrics for the duration of this predetermined time interval until the JMX collector data file is updated.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," may all refer to a circuit that executes program code to perform a function implemented in software.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for configuring a Java management extensions (JMX) collector comprising:
   a) providing a JMX collector configurator in a monitoring and reporting module on a JMX server computer used with a cloud computing platform and providing a JMX collector data file on the JMX server computer having an initial configuration of metric data for recording;
   b) determining by the JMX collector configurator, metrics output from an operations manager for the cloud computing platform;
   c) updating by the JMX collector configurator, a JMX collector data file based upon the metrics output;
   d) installing the JMX collector data file with the metrics output in the JMX collector;
   e) continuously recording by the JMX collector, data for the metrics output from the operations manager for the cloud computing platform in a computer memory wherein the continuous recording of the data is performed using configuration settings from the JMX collector data file;
   f) repeating steps b-d at a regular time interval;
   g) wherein the metrics output from the operations manager include a JMX management bean (MBean) tree structure and the preparing of the JMX collector data file is based upon the MBean tree structure;
   h) further comprising: determining by the JMX collector configurator changes to a JMX Provider MBean tree structure;
   i) preparing by the JMX collector manager, a revised JMX collector data file based upon the changes to the JMX Provider MBean tree structure;
   j) installing the revised JMX collector data file in the JMX collector; and
   k) repeating the detemining the changes to the JMX MBean tree structure, the determining, the preparing and the installing steps.

2. The method of claim 1 further comprising:
   providing an application program interface (API) in the monitoring and reporting module to determine the metrics output from the operations manager.

3. The method of claim 1 further comprising:
   searching by the JMX collector configurator, for changes to a JMX Provider MBean tree structure;

preparing by the JMX collector manager, a revised JMX collector data file if the changes to the JMX Provider MBean tree structure are detected; and installing the revised JMX collector data file in the JMX collector.

4. The method of claim 3 further comprising:

repeating the searching step at a predetermined time interval that is no less than 5 min and less than 10 minutes.

5. The method of claim 1 further comprising:

searching by the JMX collector configurator, for changes to a JMX Provider MBean tree structure;

preparing by the JMX collector manager, a revised JMX collector data file if the changes to the JMX Provider MBean tree structure are detected;

searching by the JMX collector configurator, for differences between the JMX data file and the revised JMX collector data file; and installing the revised JMX collector data file in the JMX collector if there are differences between the JMX data file and the revised JMX collector data file.

6. The method of claim 5 further comprising:

repeating the searching step at a predetermined time interval that is no less than 5 min and less than 10 minutes.

7. The method of claim 5 further comprising:

identifying and logging by the JMX collector configurator, the changes to the JMX data file; and backing up by the JMX collector manager, the JMX collector data file.

8. The method of claim 1 wherein the computer memory that stores the data from the cloud computing platform is disk memory.

9. A cloud storage platform comprising: a processor-based system executed on a computer system and configured to:

a) providing a JMX collector configurator in a monitoring and reporting module on a JMX server computer used with a cloud computing platform and providing a JMX collector data file on the JMX server computer having an initial configuration of metric data for recording;

b) determining by the JMX collector configurator, metrics output from an operations manager for the cloud computing platform;

c) updating by the JMX collector configurator, a JMX collector data file based upon the metrics output;

d) installing the JMX collector data file with the metrics output in the JMX collector;

e) continuously recording by the JMX collector, data for the metrics output from the operations manager for the cloud comprising platform in a computer memory wherein the continuous recording of the data is performed using configuration settings from the JMX collector data file;

f) repeating steps b-d at a regular time interval;

g) wherein the metrics output from the operations manager include a JMX management bean (MBean) tree structure and the preparing of the JMX collector data file is based upon the MBean tree structure;

h) further comprising: determining by the JMX collector configurator changes to a JMX Provider MBean tree structure;

i) preparing by the JMX collector manager, a revised JMX collector data file based upon the changes to the JMX Provider MBean tree structure;

j) installing the revised JMX collector data file in the JMX collector; and k) repeating the detemining the changes to the JMX MBean tree structure, the determining, the preparing and the installing steps.

10. A computer program product comprising a non-transitory computer usable medium having machine readable code embodied therein for:

a) providing a JMX collector configurator in a monitoring and reporting module on a JMX server computer used with a cloud computing platform and providing a JMX collector data file on the JMX server computer having an initial configuration of metric data for recording;

b) determining by the JMX collector configurator, metrics output from art operations manager for the cloud computing platform;

c) updating by the JMX collector configurator, a JMX collector data file based upon the metrics output;

d) installing the JMX collector data file with the metrics output in the JMX collector;

e) continuously recording by the JMX collector, data for the metrics output from the operations manger for the cloud computing platform in a computer memory wherein the continuous recording of the data is performed using configuration settings from the JMX collector data file;

f) repeating steps b-d at a regular time interval;

g) wherein the metrics output from the operations manager include a JMX management bean (MBean) tree structure and the preparing of the JMX collector data file is based upon the MBean tree structure;

h) further comprising: determining by the JMX collector configurator changes to a JMX Provider MBean tree structure;

i) preparing by the JMX collector manager, a revised JMX collector data file based upon the changes to the JMX Provider MBean tree structure;

j) installing the revised JMX collector data file in the JMX collector; and k) repeating the detemining the changes to the JMX MBean tree structure, the determining, the preparing and the installing steps.

* * * * *